United States Patent Office 2,793,180
Patented May 21, 1957

2,793,180

ELECTROLYTIC REGENERATION OF SPENT ALKYLATION SULFURIC ACID

Philip S. Fay, Lyndhurst, and Naima Visnapuu, Cleveland, Ohio, assignors to The Standard Oil Company, Cleveland, Ohio, a corporation of Ohio No Drawing. Application July 16, 1953,
Serial No. 368,509

3 Claims. (Cl. 204—130)

The present invention relates to a method for the regeneration of spent sulfuric acid from the alkylation of hydrocarbons.

The alkylation of isoparaffins with olefins to produce "alkylate" gasoline using concentrated sulfuric acid as a catalyst is a commercial process which has found wide use in the petroleum industry. In a typical alkylation process, isoparaffins and olefins in the liquid phase are contacted with concentrated sulfuric acid of approximately 98% strength. The hydrocarbon and the acid phases are separated and the acid is reused. During repeated use in the process, the acid becomes "spent" and when the concentration of the acid falls to 85 to 90% concentration, or at the lowest 80% concentration, it becomes necessary to withdraw the spent acid and supply fresh acid to the reaction. The spent acid is a more or less standardized material which varies but very little in composition between different alkylation plants. Many authorities believe that the acid becomes spent because of the fact that the olefins in the alkylation feed are dehydrogenated to more unsaturated compounds which are soluble in sulfuric acid phase and which dilute the acid catalyst. Whether or not this is a true explanation of how the acid becomes spent, it is known that the spent acid is a mixture of at least 80% sulfuric acid with the balance primarily various hydrocarbon contaminants and with a small amount of water in the acid phase. At least part of the hydrocarbon contaminants is thought to exist in the form of an acid-hydrocarbon complex in the acid phase. Although its composition is not precisely known, "spent alkylation sulfuric acid" is well-known in the industry by that name and those skilled in the art are well aware of its identity and characteristics.

Since the disposal of the spent acid is troublesome and uneconomical, the problem of regenerating the spent acid has received serious consideration in the past, and many methods have been devised for the regeneration of the acid. As examples of these prior art methods of regeneration, reference is made to U. S. Patent No. 2,015,254 which describes a method of regenerating the spent acid which comprises oxidizing the impurities by air. In U. S. Patent No. 2,287,732 the spent acid is chilled and thereafter the impurities may be removed by decanting. In U. S. Patent No. 2,418,210 the acid is regenerated by heating to form a coke out of the impurities which may then be mechanically separated. In U. S. Patent No. 2,588,331 regeneration is accomplished by sulfonation of the spent acid at high temperatures to form $SO_3$ and $CO_2$ and thereby remove the impurities.

In constrast to the prior art methods for the regeneration of spent alkylation sulfuric acid, the method of the present invention involves the regeneration of the spent alkylation acid by electrolysis.

In U. S. Patent No. 1,630,074 to Rogers et al., there is described a method for removing organic matter from refinery sludge acids by electrolysis of the acid in a diaphragmless cell. It is stated in that patent that the acid is preferably diluted to 35 to 45° Baumé by the addition of water or more dilute sludge acids and that the electrolytic process is accelerated by heating the sludge acid to a temperature of at least 100° F. The effect of the electrolysis, according to the patentees, is to cause oxidation and coagulation of the organic matter which is carried to the surface of the acid where it can be removed. There is not obtained according to this method any increase in the concentration of the acid.

In copending application Serial No. 350,097, filed April 21, 1953 there is disclosed and claimed a method for the regeneration of spent alkylation sulfuric acid which comprises electrolyzing the acid in a compartmented electrolytic cell, i. e., one separated into two compartments by a permeable diaphragm, and recovering reconcentrated and purified acid from the anode compartment of said cell and recovering waste acid from the cathode compartment of the cell. In that application it is stated that high temperatures during electrolysis cause excessive foaming of the acid and that, for this reason, the temperature preferably should not exceed about 70° F. That application furthermore contains an example in which a temperature of from 118 to 138° F. was employed and in which heavy sludging, foaming, and $SO_2$ evolution occurred resulting in an unsatisfactory experiment with but very little increase in the concentration of the acid.

The present invention comprises an improvement over the method disclosed and claimed in the aforesaid pending application Serial No. 350,097, filed April 21, 1953. In accordance with the present invention it has been found that a high temperature of electrolysis can be utilized to give the inherent efficiency of a high temperature operation, provided that a comparatively low temperature is first employed in the preliminary stages of the electrolysis. The method of the present invention comprises, accordingly, electrolyzing spent alkylation sulfuric acid in a compartmented electrolytic cell at an initial temperature not exceeding about 80° F. and thereafter raising the temperature to accelerate the rate of electrolysis. In this manner it is possible to reduce the time of electrolysis substantially, thereby achieving a significant saving in the cost of electricity.

In the practice of this invention, it is possible to avoid the heavy gasing and sludging which occurs when a high temperature is employed at the start of electrolysis. The success of the invention can be explained only in theory. It is believed that during the initial stages of electrolysis at a relatively low temperature there occurs a partial cleanup of the spent alkylation acid by selective electrolytic oxidation of the organic matter in the acid. After this selective electrolytic oxidation, if it occurs as believed, it has been found that the danger of heavy gasing and sludging is reduced or substantially eliminated. The applicant does not, however, intend to limit himself to this theory of operation.

The extent to which the temperature should be raised is not critical. Obviously, an accelerating effect may be achieved by raising the temperature only one or two degrees but, the greater the increase in temperature, the faster the electrolysis. For practical purposes, it is generally desirable to raise the temperature at least about 5° F. in order to achieve a noticeable acceleration. The upper limit to which the temperature can be raised is likewise not critical but, in order to avoid excess evaporation of the acid, it is desirable to operate at a final temperature no higher than about 150° F.

It is not possible to establish a definite period of time for the preliminary low temperature treatment. In one embodiment of the invention the raising of the temeperature may be initiated immediately at the start of electrolysis provided that the temperature is raised very gradually to avoid foaming and sludging. In another embodiment of the invention the initial temperature, i. e., a temperature not higher than 80° F., may be maintained for a few hours and thereafter the temperature may be raised relatively rapidly. In both of these embodiments, however, it can be said that the initial temperature does not exceed 80° F. and that the temperature of the acid is raised at a rate sufficiently slow to avoid excessive foaming and sludging. A rate of temperature change of from about 1 to about 10° F. per hour has been found to be practicable. It will be apparent, however, that the rate is not critical as will be obvious to one skilled in the art in view of this explanation and the illustrative examples hereinafter.

The electrolytic cell employed in the process is of conventional design and comprises an anode compartment and a cathode compartment with a permeable diaphragm separating the two compartments. Further description of cells of this type may be found in copending application Serial No. 350,097, filed April 21, 1953.

The success of the process is partially dependent on the employment of an anode which is resistant to oxidation by sulfuric acid, which is insoluble in sulfuric acid and which does not polarize under the electrolyzing conditions. Anodes of plantinum have been found especially desirable and to a lesser extent, palladium anodes.

The diaphragm is preferably formed of a material which is substantially impervious to liquid flow but which is permeable to the flow of ions. Materials of this type are well-known in the art of electrolysis and include, for example, sheets of porous clay, fiberglass mats, asbestos mats and Alundum-Carborundum plates. The anode as previously stated, must be composed of a material that is resistant to oxidation by sulfuric acid and which is not appreciably soluble in sulfuric acid. On the other hand, the material employed in the construction of the cathode is not at all critical and among the materials which have been tried and found successful are included lead, copper, mercury, graphite, nickel and platinum. In addition to these materials, it is possible to employ for the cathode any other material which is commonly employed in the construction of electrodes for electrolytic cells. The electrolytic cell may also be provided with means for cooling and heating, e. g., a water jacket.

In the operation of the process of this invention, spent acid from an alkylation plant is introduced into the electrolytic cell in an amount sufficient to submerge the electrodes of both compartments of the cell. Thereafter an electrical current is passed between the electrodes and the electrolysis is allowed to proceed, while the temperature is raised as described above, until the acid in the anode compartment has been reconcentrated sufficiently to enable it to be reemployed in an alkylation process. The concentration of acid in each of the cells may be determined from time to time by withdrawing small samples and titrating with a standardized base or by measuring the density. After the electrolysis has been allowed to proceed for a length of time, it is found that the concentration of the acid in the anode compartment is increased while the concentration of the acid in the cathode compartment ordinarily decreases. During the electrolysis, gas is liberated at the anode and the cathode. At this point the acid can be withdrawn, that from the anode compartment being recycled for use in an alkylation plant. The free sulfur in the cathode compartment can be recovered, and the balance sent to waste or to further recovery processes. It is observed that in this manner more than half of the acid contained in the original spent acid can be recovered and reused.

The following examples are given in order to illustrate the practice of the method of this invention and the advantages thereof.

*Example 1*

The electrolytic cell employed in this example was composed of a water jacketed pyrex cup divided diametrically by a sintered fiberglass diaphragm into two compartments. Each compartment was equipped with a stirrer, a rectangular electrode, a thermometer and a sampling tube. The anode was composed of platinum and the cathode composed of lead.

There was introduced into the cell 250 ml. of a spent alkylation sulfuric acid having a concentration of 90.9% with an equal volume of the acid in each of the compartments. There was then impressed between the electrodes a voltage sufficient to supply 1.5 amperes while the acid was at an initial temperature of 80° F. Thereafter the temperature of the acid was raised gradually over a period of 20 hours to 130° F. without experiencing foaming and sludging difficulties. The electrolysis was allowed to proceed for a total time of 23 hours. At the end of this time there was withdrawn from the anode compartment 125 ml. of acid having a concentration of 99.5%. There was withdrawn from the cathode compartment 125 ml. of acid having a concentration of 83.7%. The bulk of the hydrocarbon impurities was concentrated in the acid from the cathode compartment whereas the reconcentrated acid from the anode compartment was very light in color.

*Example 1A*

The experiment of Example 1 was repeated using an electrolysis temperature of 74 to 76° F. throughout for a total period of 67 hours. At the end of this time there was recovered from the anode compartment 125 ml. of acid having a concentration of 101.3% and from the cathode compartment, 125 ml. of acid having a concentration of 83.6%.

This example demonstrates the much shorter time that is required in following the teachings of the present invention, viz., 23 hours for Example 1 vs. 67 hours for the present example.

*Example 2*

The procedure of Example 1 was repeated except that an initial temperature of 58° F. was employed for 5 hours and thereafter the temperature was raised rapidly to 130° F. and held at this temperature until a total time of 28 hours had elapsed. No difficulties from foaming were encountered. At the end of this time there was recovered 125 ml. of a very light colored acid having a concentration of 100.4% from the anode compartment and 125 ml. of a very dark colored acid having a concentration of 80.2% from the cathode compartment. It was obvious that the bulk of the impurities had become concentrated in the cathode compartment.

*Example 3*

The apparatus employed in this example was similar to the apparatus employed in Example 1 except that the lead cathode was replaced with a graphite cathode.

Following the general procedure of Example 1 the cell was charged with 250 ml. of spent acid having an initial concentration of 88.6% and initial electrolysis was performed for 39 hours at a temperature of 70° F. Thereafter the temperature was raised rapidly to 110° F. without excessive foaming and held at this elevated temperature for about 23 hours giving a total time for the electrolysis of 62 hours. At the completion of the electrolysis there was recovered from the anode compartment 125 ml. of acid having a concentration of 101.6% and from the cathode compartment, 125 ml. of acid having a concentration of 84.2%.

In this example the long holding time at 70° F., i. e., 39 hours, was actually unnecessary and a much shorter time would have sufficed.

*Example 3A*

The apparatus and general procedure employed in

Example 1 were employed in this example. The spent acid had a temperature between 120 and 140° F. at the start of electrolysis and the temperature was maintained in this range for a total time of 25 hours. The result was unsatisfactory. Much foaming, sludging, and sulfur dioxide evolution occurred and the acid from the anode compartment had a concentration of only 91.8%.

This example shows that it is not feasible to employ a high temperature at the start of the electrolysis.

The current density which can be used in the electrolysis operation of this invention is not critical and may vary from about 2 amperes per square decimeter to about 15 amperes per square decimeter. Too great a current density causes excessive foaming and this may determine the practical upper limit. Other modifications will be apparent to those skilled in the art.

It is intended to cover all changes and modifications in the examples of this invention herein given for purposes of disclosure which do not constitute departure from the spirit and scope of the appended claims.

We claim:

1. A method for the regeneration of spent alkylation sulfuric acid having 80% to 90% acid concentration and the balance consisting primarily of hydrocarbon-containing contaminants by electrolyzing said spent alkylation sulfuric acid in a compartmented electrolytic cell, which comprises starting up the electrolysis at an initial temperature not exceeding about 80° F., thereafter elevating the temperature at least about 5° F. to a final temperature of about 120° F. to 150° F. at a rate sufficiently slow to avoid difficulties resulting from foaming, and continuing the electrolysis at said elevated temperature.

2. A method according to claim 1 in which the temperature of the acid is raised at the rate of 1 to 10° F. per hour.

3. A method in accordance with claim 1 in which said final temperature is about 150° F.

References Cited in the file of this patent

UNITED STATES PATENTS

| | | |
|---|---|---|
| 1,630,074 | Rogers | May 24, 1927 |
| 2,618,592 | Horvitz | Nov. 18, 1952 |

FOREIGN PATENTS

| | | |
|---|---|---|
| 226,002 | Switzerland | July 1, 1943 |
| 127,985 | Germany | Feb. 5, 1902 |